D. H. Geiger,
Fan Blower.

No. 90,440.  Patented May 25, 1869.

Witnesses:
Wm A Morgan
G C Cotton

Inventor:
David H Geiger
per Munn & Co
Attorneys

United States Patent Office.

DAVID H. GEIGER, OF ST. CLAIR, PENNSYLVANIA.

Letters Patent No. 90,440, dated May 25, 1869.

---

IMPROVED APPARATUS FOR COLLECTING AND FORCING GASES FROM BLAST, PUDDLING, AND OTHER FURNACES.

---

The Schedule referred to in these Letters Patent and making part of the same.

---

*To all whom it may concern:*

Be it known that I, DAVID H. GEIGER, of St. Clair, in the county of Schuylkill, and State of Pennsylvania, have invented a new and improved Water Fan-Blower; and I do hereby declare that the following is a full, clear, and exact description thereof, which will enable those skilled in the art to make and use the same, reference being had to the accompanying drawings, forming part of this specification.

The object of this invention is to construct a fan for drawing and forcing the products of combustion, or flame and heated gases, through suitable flues or passages in smelting-furnaces, heating and puddling-furnaces, and for generating steam in boilers, or for any other purpose when it is required to circulate heated air or gases.

Figure 1:
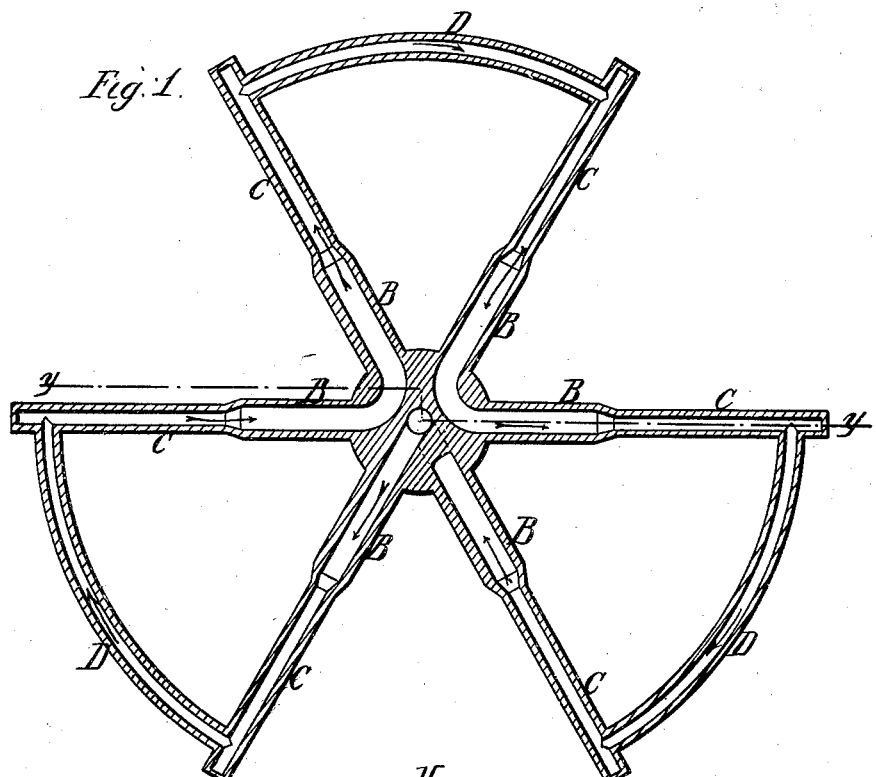
Figure 2:
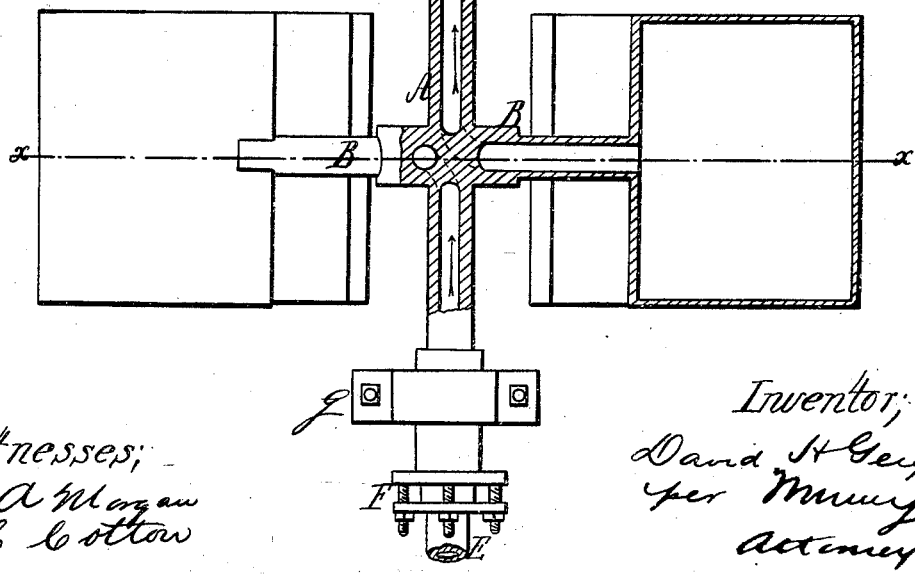

Fan-blowers of ordinary construction, if used for this purpose, would soon be destroyed, or so distorted by the heat as to become useless; and My invention consists in providing for a circulation of water or other fluid through the arms and wings of the fan, whereby they are protected from injury, as will be hereinafter more fully described Figure 1 represents a vertical section of the fan, through the line $x\ x$ of fig. 2, showing the hollow arms and wings, and the manner in which the wings are constructed, and the course of the water through them.

Figure 2 is a horizontal section through the line $y\ y$ of fig. 1, showing the hollow shaft, and the manner in which the water is received and discharged.

Similar letters of reference indicate corresponding parts.

A represents the fan-shaft;
B represents the arms;
C, the wings; and
D, the pipe by which the wings are connected.

The shaft is hollow from each end to a point near its centre.

The water is admitted into the end marked E, where the joint made by the water-pipe with the shaft is rendered tight by a suitable stuffing-box, as seen at F, in the drawing.

$g\ g$ represent the journal-boxes of the shaft.

The arms and wings are made hollow, and the course of the water through them is indicated by arrows seen in fig. 1, the water being returned to the shaft, and discharged from the end marked H.

It will be seen that by thus constructing a fan, water can be forced through all its parts, thereby preventing the heat from having any injurious effect upon the machine.

The outlet-pipe, at H, is also provided with a stuffing-box, to prevent the escape of water.

In setting the fan for use, the casing may be made of brick or masonry, or of iron or other metal, with a water-space, with the water forced through it the same as through the blower.

I do not confine myself to any particular system of flues, or passages, through which to either draw or force the products of combustion, nor to any particular application of the fan, either to furnaces or for generating steam, or for transferring heat for other purposes.

There are various methods by which this may be done, and it will perhaps be necessary to vary the method according to the application made or purpose to be accomplished.

Neither do I confine myself to the particular mode shown in the drawing for constructing the fan, but may make it with more or less arms and wings, with the water-spaces arranged in a similar manner.

In using the fan for generating steam, the products of combustion can be drawn into the fan, and forced through suitable flues to the fire-box, and through the boiler-flues or under the boiler, thus keeping up a constant circulation.

With a proper temperature, and the admission of a suitable quantity of atmospheric air, a perfect combustion may be produced, and the carbonic oxide and other combustible gases, which are usually suffered to escape, may be consumed, and fuel thereby economized.

I claim as new, and desire to secure by Letters Patent—

1. A fan-blower, constructed with hollow shaft, arms, and wings, substantially as herein shown and described.

2. Circulating the heated gases and products of combustion of blast-furnaces, or furnaces used for other purposes, by passing them through a water-protected fan-blower, substantially as described.

DAVID H. GEIGER.

Witnesses:
JOHN L. GEIGER,
B. EISENHUTH.